(12) United States Patent
Heltsch et al.

(10) Patent No.: US 11,518,112 B2
(45) Date of Patent: Dec. 6, 2022

(54) JOINING METHOD AND MACHINING HEAD AND MANUFACTURING MACHINE FOR CARRYING OUT THE METHOD

(71) Applicants: Airbus Operations GmbH, Hamburg (DE); Fraunhofer-Gesellschaft zur Förderung der angewandten For-schung e.V., Munich (DE)

(72) Inventors: Norbert Heltsch, Hamburg (DE); Jens Standfuss, Pirna (DE); Annett Klotzbach, Dresden (DE)

(73) Assignees: AIRBUS OPERATIONS GMBH, Hamburg (DE); FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 134 days.

(21) Appl. No.: 16/725,568

(22) Filed: Dec. 23, 2019

(65) Prior Publication Data
US 2020/0207029 A1   Jul. 2, 2020

(30) Foreign Application Priority Data

Dec. 28, 2018   (DE) ............... 10 2018 133 676.4

(51) Int. Cl.
B29C 65/00   (2006.01)
B64C 1/12   (2006.01)
(Continued)

(52) U.S. Cl.
CPC ........... B29C 66/1122 (2013.01); B64C 1/12 (2013.01); *B27D 5/003* (2013.01); *B29C 66/721* (2013.01);
(Continued)

(58) Field of Classification Search
CPC ............ B29C 66/1122; B29C 66/8362; B29C 70/38–388; B29L 2031/3082; B64C 1/069; B64C 1/12
(Continued)

(56) References Cited

U.S. PATENT DOCUMENTS 2,930,406 A   3/1960   Galloway
8,695,669 B2 *   4/2014   Engelbart ............. B29C 70/384
                                                            156/367

(Continued)

FOREIGN PATENT DOCUMENTS

CN   105936131 A   9/2016
CN   108026302 A   5/2018
(Continued)

OTHER PUBLICATIONS

European Search Report for corresponding European Patent Application No. 19218750 dated Apr. 23, 2020.
(Continued)

*Primary Examiner* — Carson Gross
(74) *Attorney, Agent, or Firm* — Greer, Burns & Crain, Ltd.

(57) ABSTRACT

A joining method for connecting at least two thermoplastic workpieces is provided to permit the joining even of non-transparent carbon fiber reinforced plastics parts by means of laser welding, in which a splice is produced at the edge regions of the workpieces and the workpieces are subsequently positioned relative to one another in such a manner that the opposite splice regions bound a seam region. Connecting bodies are then inserted into the seam region and heated by means of local heat input by laser beam such that a fixed integrally bonded connection forms between the workpieces and the connecting bodies.

14 Claims, 6 Drawing Sheets

(51) Int. Cl.
  *B27D 5/00* (2006.01)
  *B29K 101/12* (2006.01)
  *B29L 31/30* (2006.01)
  *B64C 1/06* (2006.01)
  *B64C 1/00* (2006.01)

(52) U.S. Cl.
  CPC .... *B29C 66/73921* (2013.01); *B29C 66/8362* (2013.01); *B29C 2791/009* (2013.01); *B29K 2101/12* (2013.01); *B29L 2031/3082* (2013.01); *B64C 1/069* (2013.01); *B64C 2001/0072* (2013.01)

(58) Field of Classification Search
  USPC ......................................................... 156/363
  See application file for complete search history.

(56) References Cited

U.S. PATENT DOCUMENTS

| | | |
|---|---|---|
| 10,046,511 B1 | 8/2018 | Mantha |
| 10,864,698 B2 | 12/2020 | Chino et al. |
| 2014/0311654 A1* | 10/2014 | Hansen ................... B29C 65/08 156/73.1 |
| 2015/0158208 A1 | 6/2015 | Williams et al. |
| 2016/0025742 A1 | 1/2016 | Reichardt et al. |
| 2016/0257427 A1* | 9/2016 | Humfeld ............. B29C 35/0266 |
| 2017/0021565 A1 | 1/2017 | Deaville |
| 2019/0039338 A1 | 2/2019 | Heltsch et al. |
| 2019/0375190 A1* | 12/2019 | Duval ....................... B32B 5/12 |
| 2019/0381742 A1* | 12/2019 | Witte ................... B29C 66/721 |
| 2020/0055259 A1* | 2/2020 | Tiryaki ............... B29C 66/1122 |
| 2021/0370615 A1* | 12/2021 | Dowling ............. B29C 65/4835 |

FOREIGN PATENT DOCUMENTS

| | | |
|---|---|---|
| DE | 102017117383 A1 | 2/2019 |
| WO | 2004106038 A2 | 12/2004 |
| WO | 2014029969 A1 | 2/2014 |
| WO | 2015164954 A1 | 11/2015 |

OTHER PUBLICATIONS

German Search Report; priority document.
Chinese Office Action for corresponding Chinese Patent Application No. 201911378046.6 dated Aug. 25, 2022.

* cited by examiner

JOINING METHOD AND MACHINING HEAD AND MANUFACTURING MACHINE FOR CARRYING OUT THE METHOD

CROSS-REFERENCES TO RELATED APPLICATIONS

This application claims the benefit of the German patent application No. 10 2018 133 676.4 filed on Dec. 28, 2018, the entire disclosures of which are incorporated herein by way of reference.

FIELD OF THE INVENTION

The invention relates to a joining method for connecting at least two thermoplastic workpieces. Furthermore, the invention relates to a machining head and to a manufacturing machine for carrying out the method.

BACKGROUND OF THE INVENTION

The use of laser technology for joining thermoplastic parts is known in general and has already been applied for some time on an industrial scale, including induction welding, transmission laser welding or in-situ advanced fiber placement technology: AFPT for short). One example is known from Airbus invention disclosure CPA10420 "Integrated joining by vaporization of spliced seams." In addition to laser welding technology, this discloses a laser vaporization process in order to provide splice joints as structurally efficient intersection surfaces.

Transmission laser welding basically requires at least one of the joining pieces to be mostly transparent so that the laser can penetrate the part to beneath the joining surfaces. Diffusion of the laser and overall heating of the connection can scarcely be avoided and can have a considerable influence on the controllability and speed of the joining process. In addition to the requirement for material transparency, this technology is also restricted by the thickness of the joining parts.

Induction welding leads, like transmission laser welding, to overall heating with restrictions for the process control, and to lightning protection caused by input of energy into carbon fibers and/or copper mesh.

SUMMARY OF THE INVENTION

The invention is based on an object of proposing measures which permit an improved process sequence for the joining of composite components.

The invention provides a joining method for connecting at least two thermoplastic workpieces which, in particular, contain fiber reinforced plastic or manufactured therefrom, with the steps of:

a) splicing an edge region on at least one of the workpieces in order to produce at least one splice region;

b) positioning the workpieces relative to one another in such a manner that the splice region of the one workpiece and the other workpiece bound a seam region;

c) inserting a connecting body into the seam region and heating that part of the connecting body which is located in the seam region by means of local input of heat in order to form an integrally bonded connection between each workpiece and the connecting body.

It is preferred that, in step a), the splicing takes place by corresponding fiber placement, material abrasion, laser ablation, machining and/or milling.

It is preferred that, in step a), the splice region is formed in a stepped manner by a plurality of workpiece layers of the workpiece.

It is preferred that, in step a), the splice region is pretreated by fibers of the workpiece being exposed.

It is preferred that, in step a), the splice region is pretreated by fibers of the workpiece being exposed by means of laser surface treatment.

It is preferred that, in step a), the splice region is pretreated by the workpiece being coated with a microstructured functional layer.

It is preferred that, in step a), the splice region is pretreated by the workpiece being plasma-coated with a microstructured functional layer.

It is preferred that, in step b), the workpieces are positioned in such a manner that a manufacturing gap is formed between the workpieces or the lowermost workpiece layers of the workpieces.

It is preferred that in, step b), the workpieces are positioned in such a manner that the width of the seam region increases or increases step by step in a direction perpendicular to the workpiece layers.

It is preferred that, in step b), the distance along the parallel direction to the workpiece layers between the workpieces increases or increases step by step in a direction as viewed perpendicularly to the workpiece layers.

It is preferred that, in step b), the distance along the parallel direction to the workpiece layers between the lowermost workpiece layers is the smallest distance between the workpieces.

It is preferred that, in step b), the manufacturing gap is the smallest distance between the workpieces along the parallel direction to the workpiece layers.

It is preferred that, in step c), the connecting body is pressed against the workpiece by means of a pressing device, in particular a pressing roller, wherein preferably the pressing device detects the connecting body on a connecting body wide side facing away from the workpiece.

It is preferred that, in step c), the connecting body is heated on, in particular, an individual, connecting body wide side.

It is preferred that, in step c), a connecting body wide side faces the closest lower workpiece layer.

It is preferred that, in step c), the connecting body is heated on at least one, in particular both, connecting body narrow sides.

It is preferred that, in step c), the connecting body narrow side faces the closest workpiece layer narrow side in the transverse direction of the seam region.

It is preferred that, in step c), a plurality of connecting bodies are inserted and heated layer by layer in order to produce a connecting body layer which is connected in an integrally bonded manner to the respective workpiece layer.

It is preferred that, in step c), when a first connecting body layer is inserted, the connecting body is pressed by means a pressing device which detects the connecting body, and a counter pressing device which detects the workpiece, in particular, a lowermost workpiece layer.

It is preferred that the counter pressing device extends below and between the workpieces.

It is preferred that the counter pressing device has a blade which is introduced between the workpieces when the pressing takes place.

It is preferred that the counter pressing device has a counter pressing roller which is arranged opposite the pressing device, in particular, on an end region of the blade.

It is preferred that, in step c), when a second or further connecting body layer is inserted, the connecting body is pressed against the workpiece, in particular against a workpiece layer corresponding to the connecting body layer, only by means of a pressing device which detects the connecting body.

It is preferred that, in step c), the heating takes place by scanning a laser beam over the seam region.

It is preferred that, in particular in step c), the manufacturing gap is filled by means of filling material during the insertion and heating of a first connecting body layer.

It is preferred that the connecting body is in the form of a flexible connecting strip.

It is preferred that the connecting body contains an at most partially cured fiber reinforced plastic or is manufactured therefrom.

It is preferred that the connecting body contains a metal sheet or is manufactured therefrom.

It is preferred that the connecting body contains a fiber metal layer or is manufactured therefrom.

It is preferred that the connecting body contains a multi-layered, fiber reinforced plastic or is manufactured therefrom.

It is preferred that the fiber reinforced plastic is a carbon fiber reinforced plastic and/or a glass fiber reinforced plastic.

The invention provides a machining head for a manufacturing machine which is designed for manufacturing a fuselage component for a fuselage segment of an aircraft or a fuselage segment for an aircraft, wherein the machining head is designed for connecting at least two workpieces which contain fiber reinforced plastic or are manufactured therefrom, and comprises a splicing device which is designed for splicing an edge region on at least one of the workpieces in order to produce at least one splice region, an insertion device which is designed for inserting a connecting body into a seam region between the workpieces, an activation device which is designed for heating that part of the connecting body which is located in the seam region by means of local heat input, and a pressing device which is designed for pressing the heated connecting body onto the workpiece in order to form an integrally bonded connection between each workpiece and the connecting body.

It is preferred that the counter pressing device is designed to be removable in order, when a second or further connecting body layer is inserted, to press the connecting body against the workpiece, in particular against a workpiece layer corresponding to the connecting body layer, only by means of the pressing device.

It is preferred that the activation device is designed to heat the connecting body on, in particular, an individual, connecting body wide side.

The machining head preferably comprises a counter pressing device which is designed to detect the workpiece, in particular a lowermost workpiece layer, and to press same in the direction of the pressing device.

It is preferred that the pressing device is arrange to detect the connecting body on a connecting body wide side facing away from the workpiece.

It is preferred that the mating pressing device extends below and between the workpieces.

It is preferred that the counter pressing device has a blade which can be introduced between the workpieces.

It is preferred that the counter pressing device has a counter pressing roller which is arranged opposite the pressing device, in particular on an end region of the blade.

The machining head preferably comprises a filling material supply device which is designed to supply filling material to the seam region, in particular to a manufacturing gap, so that the seam region can be partially filled by means of filling material when a first connecting body layer is inserted and heated.

It is preferred that the activation device comprises a laser device which is designed to produce a laser beam for heating purposes and to conduct same to the seam region.

It is preferred that the laser device comprises a scanner module which is designed for scanning the laser beam over the seam region.

The machining head preferably comprises a pretreatment device which is designed in such a manner that a laser beam can be produced and can be conducted to the seam region which is designed in such a manner that fibers of the workpiece can be exposed because of the irradiation thereof with the laser beam.

The machining head preferably comprises a pretreatment device which is designed in such a manner that a micro-structured functional layer can be produced on the workpiece.

The invention furthermore provides a manufacturing machine which is designed to carry out a preferred method and which comprises a preferred machining head.

The manufacturing machine preferably comprises a workpiece positioning device which is designed to position workpieces in such a manner that a manufacturing gap can be produced between the workpieces, in particular the lowermost workpiece layers of the workpieces.

It is preferred that the splicing device forms the splice region in such a manner that, after positioning, the width of the seam region increases, in particular step by step and/or constantly, in a direction perpendicular to the workpiece layers.

It is preferred that the distance along the parallel direction to the workpiece layers between the workpieces increases, in particular step by step and/or constantly, in a direction as viewed perpendicular to the workpiece layers.

It is preferred that the distance along the parallel direction to the workpiece layers between the lowermost workpiece layers is the smallest distance between the workpieces.

It is preferred that the manufacturing gap is the smallest distance between the workpieces along the parallel direction to the workpiece layers.

The invention was made within the project "NEW2025 Multifunctional Fuselage" of TP194 "Typical and Lower Centre Fuselage". In addition to the nose and the fuselage, the project is directed toward future technologies for typical application in fuselage components, including system integration and joining concepts.

The invention can also be used in any seam composed of thermoplastic carbon fiber reinforced plastic (CFRP for short) or thermoplastically coated metal and also in fiber metal laminate (FML) parts or sheets. The most suitable use is probably in the joining of fuselage coverings and fuselage components, for example longitudinal seams for manufacturing relatively large components, for example, fuselage segments, and peripheral seams for final manufacturing, for example for connecting the fuselage segments.

In contrast to the known methods, the invention takes the opportunity of directly heating the joining surfaces by one of the joining parts being able to be raised. Comparably to the AFPT process which is known per se, the laser is conducted into an opening gap in order to locally heat the surface to melting point. Melting of resin in the entire portion can therefore be avoided by the melting zone being reduced to the joining surfaces. While CFRP materials are, by contrast, not accessible to a transmission laser welding method, the invention makes it possible to apply laser welding methods to CFRP. In contrast to the AFPT process which positions individual layers, the invention makes use of a set of layers which is sufficiently bendable in order to leave a gap for the laser.

The invention uses the weldability of thermoplastic CFRP materials which have been selected within the project. The invention avoids CFRP dust in the component manufacturing and the final installation and therefore permits a cost-efficient assembly of prefitted fuselage coverings and fuselage sections. The invention combines existing technologies, such as, for example, laser beam welding and thermoplastic shaft joining, with industrialized automated applications which have been derived from continuing IWS and Airbus projects. What is referred to as the MuVaX concept has been developed for integrated seam preparation and joining of metallic structures by friction stir welding for the final manufacturing with the effect that only one side is accessible.

The method proposed here is inherently robust in application because of the use of a laser for local heating of the welding line in combination with the temperature control of the surfaces by means of thermal cameras during the joining process. By contrast, both transmission laser welding and induction welding are dependent on predefined process parameters in order to predict the melting point in the welding line. However, the melting point is a key parameter of the process for the quality of the connection. Induction welding is therefore less robust during application and cannot necessarily compensate for unrecognized process parameters such as, for example, local changes in the layer thickness. Furthermore, the invention can be used to join other material fuselage concepts, such as the metal waffle sheet design, FML structures or any other combination, with a thermoplastic coating or matrix.

An important concept is the laser welding of longitudinal thermoplastic connections in the manufacturing of components. This permits the joining/connecting of fuselage coverings on an industrial scale. It is inherently robust and flexible in use, among other things, because of the capability of controlling the surface temperature of the joining surface and the cooling process by means of thermal cameras. Since the spliced geometry can absorb tangential tolerances, the concept permits an accumulation of geometrical tolerances on a part level or during the positioning of the fuselage covering. Since the seam is not thoroughly heated over the entire thickness, the probability of distortions or incorporated tensions in the end seam can be reduced.

The technical design is similar to AFPT, but uses tapes of multi-layered CFRP material with a different material orientation. The precommissioning of the tapes on large rollers instead of individual strips can increase the speed of the process and permit the use of simple supporting and pressing tools in order to close the connection and to control the formation process during the cooling process. The MuVaX system can be adapted to receive the laser and the tape material in order to weld the seam at the component manufacturing level. Thermal cameras are used in order to observe the laser heating and the material temperature in the environment in order to control the cooling process. The industrial design is suitable for welding thermoplastic connections of hybrid structures, such as, for example, FML or waffle sheet designs, and could also be used outside the aerospace industry.

Method steps are, in particular:
1) preparing a spliced seam by adapted fiber placement, laser ablation or mechanical machining;
2) surface structuring/activation by laser and/or plasma in order to increase the connection strength;
3) fixing, edge preparation and positioning by means of the MuVaX concept for the final manufacturing;
4) laser welding of the first layer with pressing roller and assisting counter pressure roller, gap filling with thermoplastic filling wire by means of the laser beam welding unit of the MuVaX system,
5) laser welding of the second to n-th layer by means of laser welding.

BRIEF DESCRIPTION OF THE DRAWINGS

Exemplary embodiments will be explained in more detail with reference to the attached schematic drawings, in which.

DETAILED DESCRIPTION OF THE PREFERRED EMBODIMENTS

Figure 1:
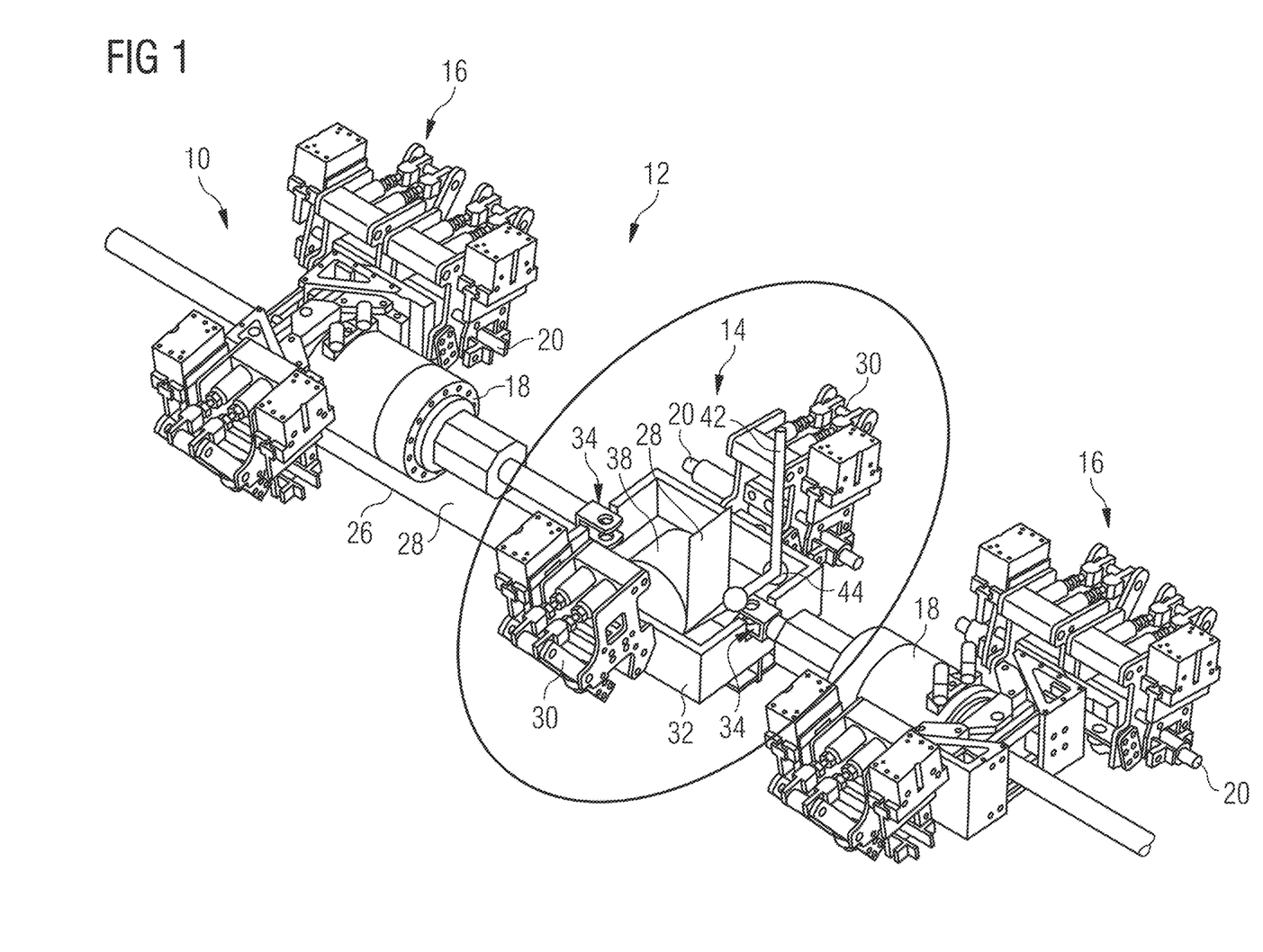
FIG. 1 shows an exemplary embodiment of a manufacturing machine.

Reference is first of all made to FIG. 1 which shows a partial view of a manufacturing machine 10. The manufacturing machine 10 extends along a longitudinal direction which may also be referred to as the manufacturing direction.

The manufacturing machine 10 comprises a tool transport device 12 which is designed for transporting different machining heads 14. The tool transport device 12 has two tool transport units 16 which are spaced apart along the manufacturing direction. The machining head 14 is arranged between the two tool transport units 16.

The tool transport units 16 are moved along the manufacturing direction by means of pneumatic or hydraulic cylinders 18. The tool transport units 16 are moved discontinuously here, while the machining head 14 is moved continuously. The tool transport units 16 have guide devices 20 which are spaced apart transversely with respect to the manufacturing direction and are guided on guide rails 24 by means of guide rollers 22. The guide rails 24 are only partially illustrated for the purpose of clarity.

Figure 2:
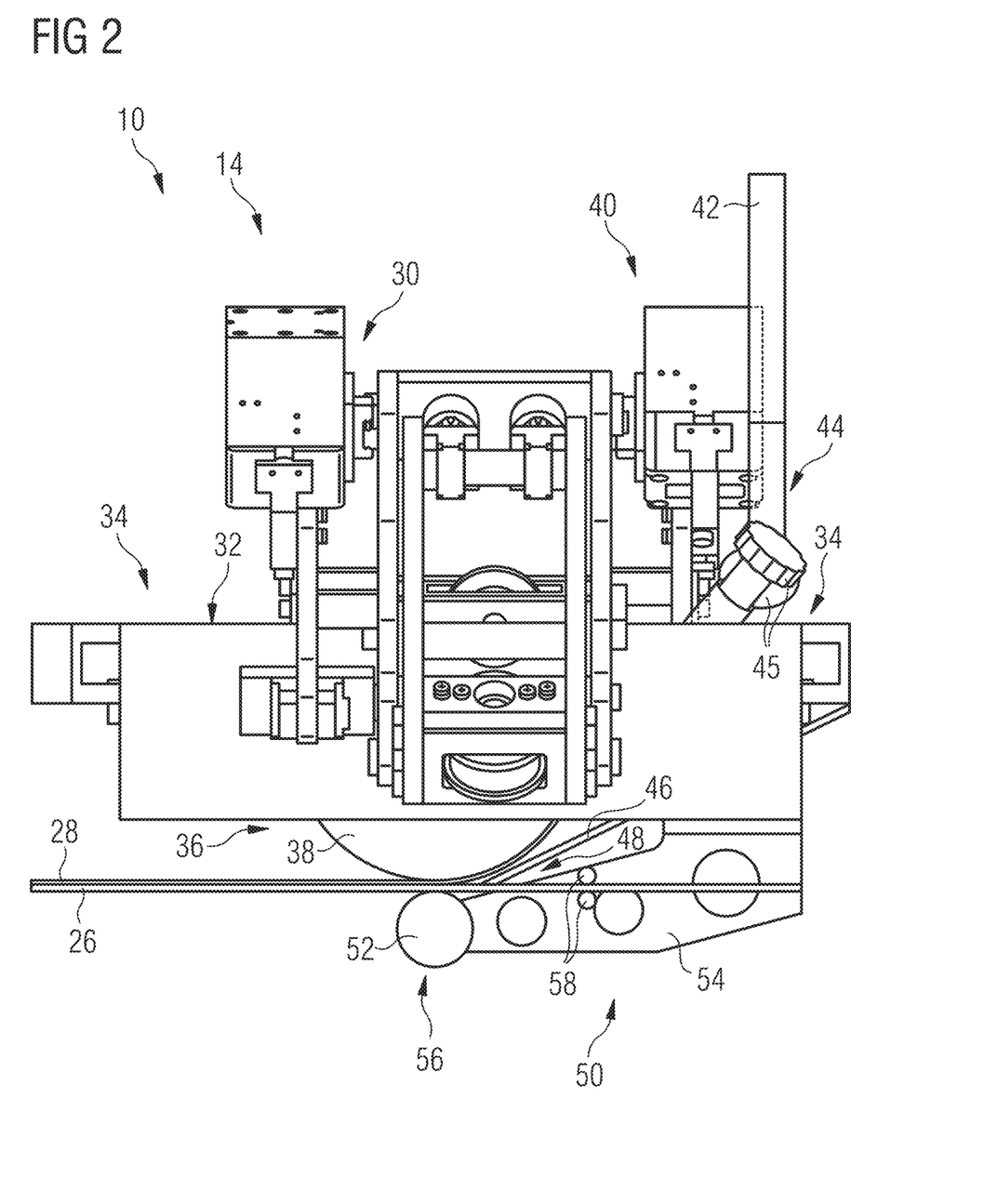
FIG. 2 shows an exemplary embodiment of a machining head.
Figure 3:
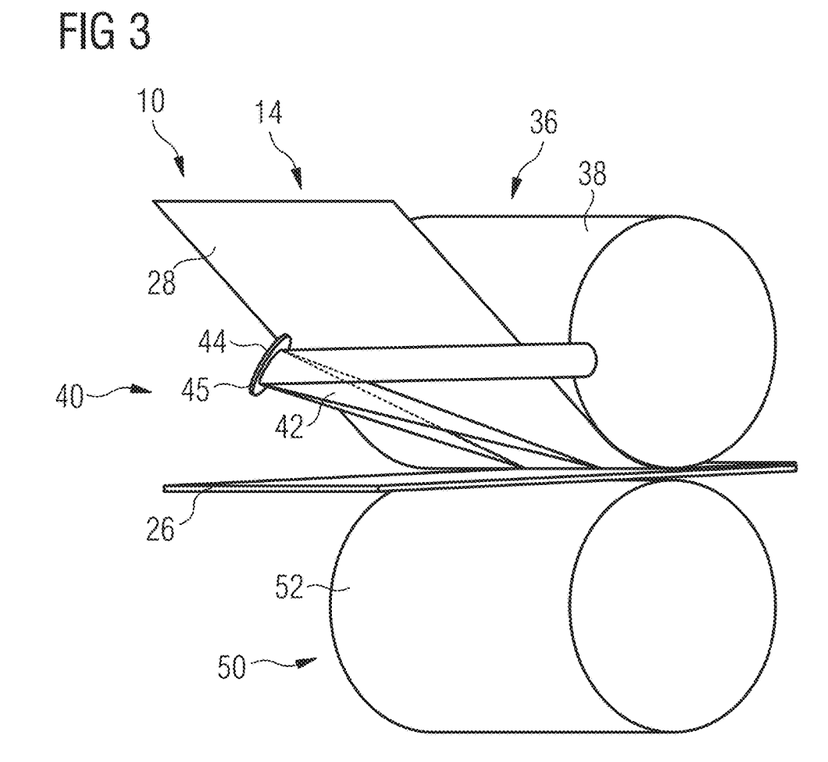
FIG. 3 shows a detailed view of part of the machining head from FIG. 3.

An exemplary embodiment of the machining head 14 is illustrated in more detail in FIG. 2 and FIG. 3. The machining head 14 is designed to connect thermoplastic workpieces 26 to one another by means of a connecting body 28.

The machining head 14 comprises a machining head guide device 30 for guiding the machining head 14 along the manufacturing direction which runs from left to right in FIG. 2.

The machining head 14 comprises a supporting frame 32 which provides fastening regions for different components of the machining head 14. The supporting frame 32 has a pair of cylinder couplings 34 by means of which the machining head 14 can be connected to the cylinders 18.

The machining head 14 furthermore comprises a pressing device 36 with at least one pressing roller 38 which can press the connecting body 28 onto at least one of the workpieces 26 in order to connect the latter to one another in an integrally bonded manner.

For the connection, the machining head 14 can furthermore comprise a laser device 40 which can conduct a laser beam 42 onto the workpieces 26 of the connecting body 28 by means of a scanner module 44. The scanner module 44 comprises at least one scanner mirror 45 which is movable by means of an actuator.

The machining head 14 also has a filling material supply device 46 which is designed to supply a filling material 48, for example thermoplastic resin or thermoplastic.

The machining head 14 can have a counter pressing device 50 which is provided in a releasable manner. The counter pressing device 50 preferably has a counter pressing roller 52. The counter pressing roller 52 can be designed to be smaller in diameter than the pressing roller 38.

Furthermore, the counter pressing device 50 can comprise a blade 54 which extends between the workpieces 26 and on the end region 56 of which the counter pressing roller 52 is arranged.

At least one pair of blade guide rollers 58 can be arranged on the blade 54 and can improve the movement of the blade 54 through the workpieces 26.

The pressing device 36 and the counter pressing device 50 define a gap between them for the workpieces 26 and the connecting body 28 such that they can be pressed.

Figure 4:
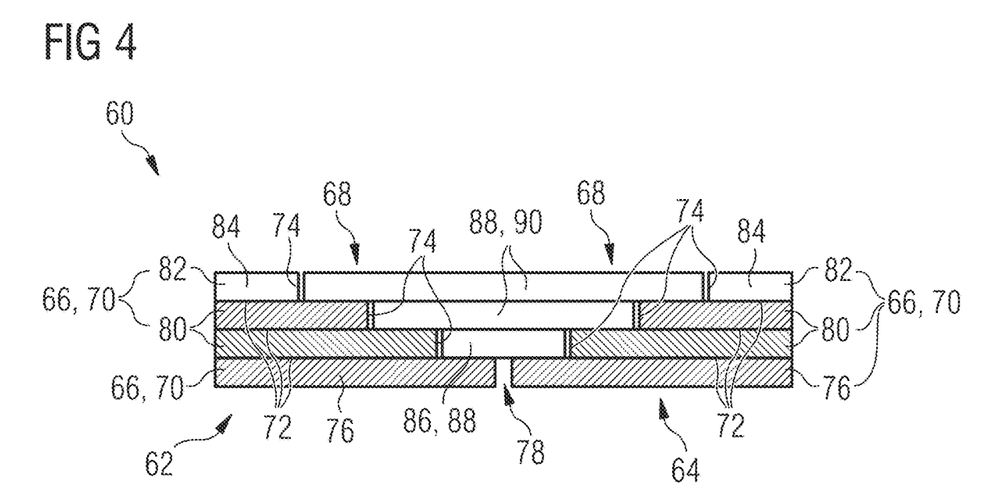
FIG. 4 shows a cross-sectional view of a seam region.
Figure 5:
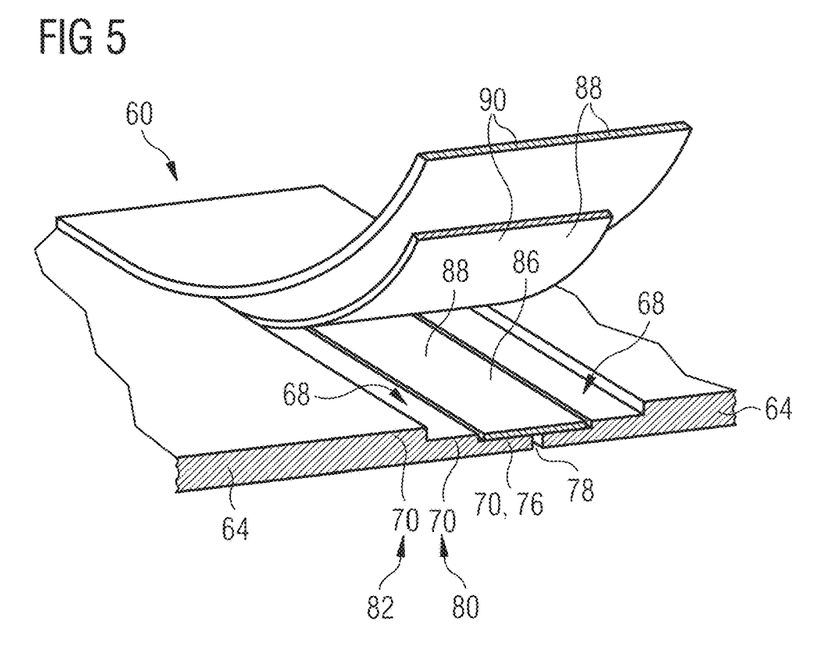
FIG. 5 shows a perspective view of a seam region.

Reference is made below to FIG. 4 and FIG. 5 which show a seam region 60. A first workpiece 62 and a second workpiece 64 comprise a plurality of workpiece layers 66.

The workpiece layers 66 are designed in such a manner, for example as early as during the production or else by material machining after production, that each workpiece 62, 64 has a splice region 68.

Each workpiece 62, 64 comprises a plurality of workpiece layers 70. The workpiece layers 70 are each placed on one another with a workpiece layer wide side 72 such that a workpiece layer narrow side 74 of one workpiece 62, 64 in each case faces a workpiece layer narrow side 74 of the other workpiece 64, 62.

Lowermost workpiece layers 76 which form the lowerside surface of the workpieces 62, 64 can form a manufacturing gap 78 for the blade 54 of the counter pressing device 50. The manufacturing gap 78 is significantly narrower than the distance between the workpiece layer narrow sides 74.

The lowermost workpiece layer 76 can be adjoined by a plurality of workpiece intermediate layers 80 which in turn each rest on one another with their workpiece layer wide side 72.

Furthermore, uppermost workpiece layers 82 which form the upper-side surface of the workpieces 62, 64 can be provided.

In the present example, the lowermost workpiece layer 76 and the workpiece intermediate layers 80 are formed from fiber-reinforced plastics material, while the uppermost workpiece layer 82 is formed from a metal sheet 84. Reference is also made in this connection to fiber metal laminates, FML for short.

It should be noted that any combination is conceivable here and that this primarily depends on the desired application region.

In order to connect the workpieces 62, 64, the procedure is now as follows. A tape-shaped first connecting body 86 which can be supplied, for example, as a connecting tape 88 on rollers and can likewise be formed from fiber-reinforced plastic is inserted into the seam region 60 bounded by the respective splice regions 68 and optionally the manufacturing gap 78 after the first connecting body 86 and the two workpieces 62, 64 have been heated by the laser beam 42 in such a manner that an integrally bonded connection between the first connecting body 86 and the workpieces 62, 64 subsequently takes place with the aid of the pressing device 36 and the counter pressing device 50. In the same time frame, the filling material 48 which is supplied to the seam region 60 by the filling material supply device 46 can completely close the manufacturing gap 78. In both operations, the laser beam 42 is scanned over the entire width of the seam region 60 by means of the scanner module 44 and therefore heat is introduced locally. In the process, only the surfaces of the workpieces 62, 64 and of the first connecting body 86 melt, and therefore excessive heating of the other regions of these components can be prevented.

In a further working step, first of all the counter pressing device 50 is removed and then the operation is repeated with further connecting bodies 90 until the entire seam region 60 is closed off in a flush manner.

Figure 6:
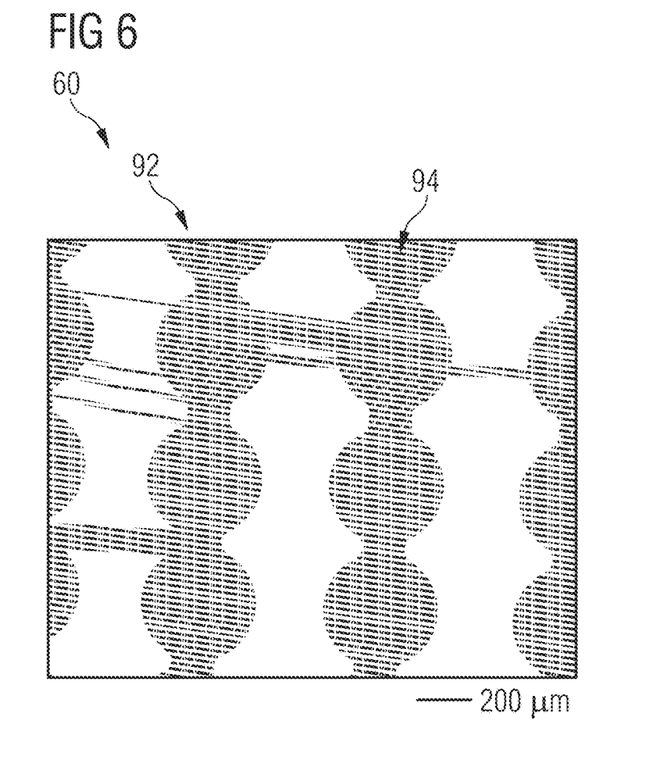
FIG. 6 shows a view of a pretreated splice region.
Figure 7:
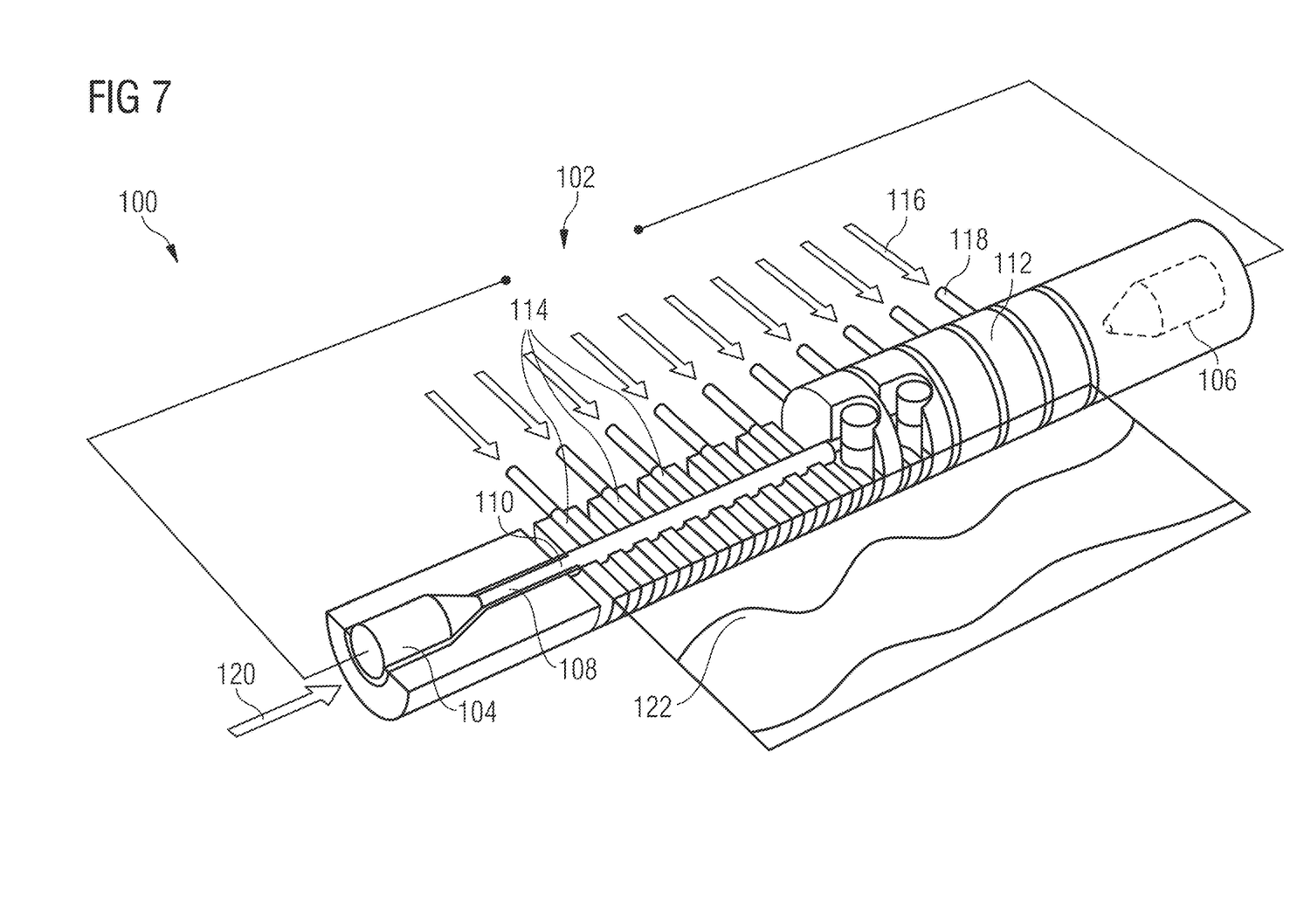
FIG. 7 shows an exemplary embodiment of a pretreatment device.
Figure 8:
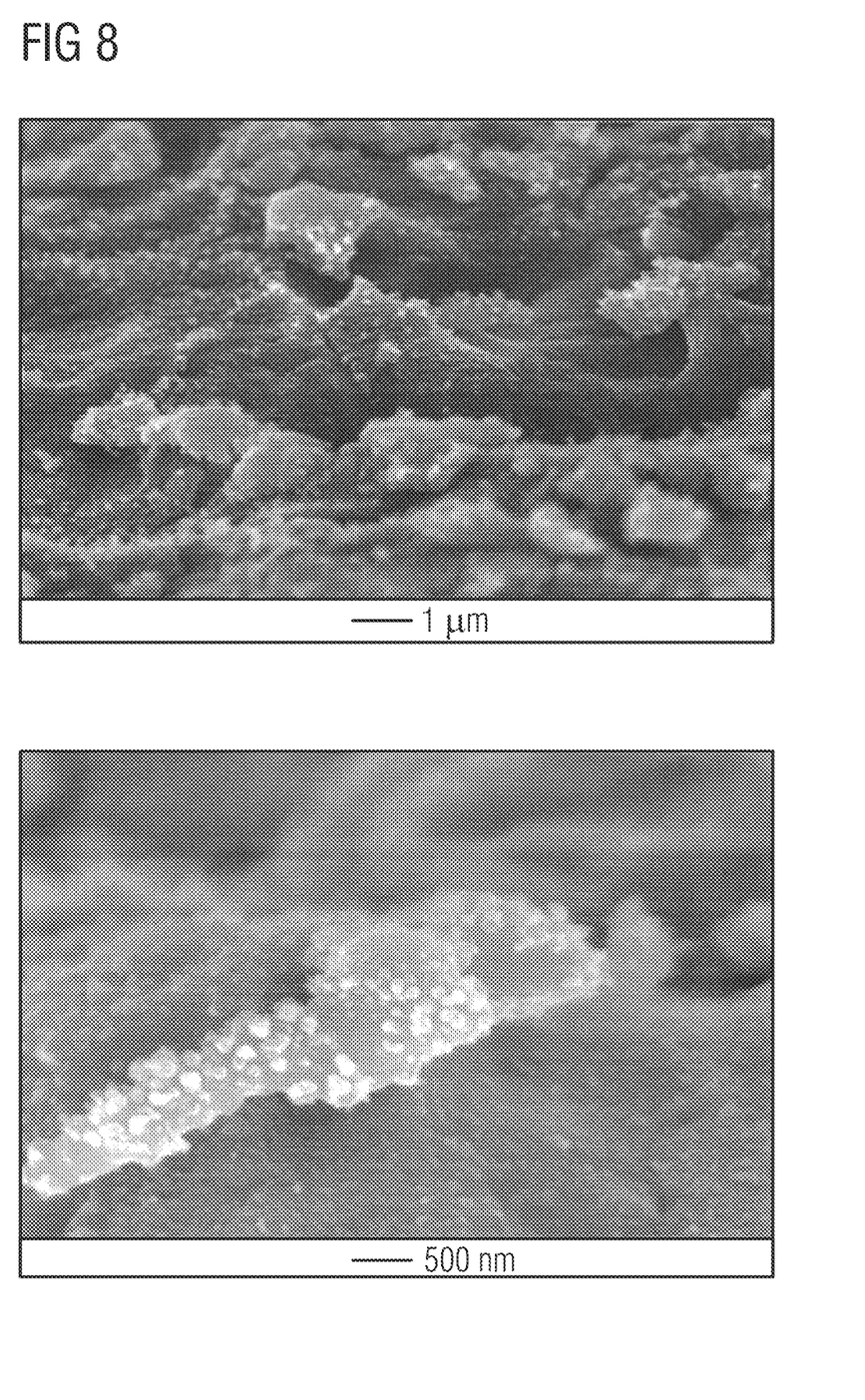
FIG. 8 shows an exemplary embodiment of a functional layer.

Reference is also made below to FIG. 6 to FIG. 8 which show measures for improving the integrally bonded connection by the strength of the connection being able to be increased.

FIG. 6 shows an enlarged detail of a splice region 92 which has been preheated by means of a laser treatment. The parameters of the laser beam have been selected here in such a manner that the fibers of the splice region 92 have been exposed without destruction by ablation of the matrix material. This measure makes it possible to provide a reproducible, consistent surface structure 94. Furthermore, local treatment of the splice region 92 is possible, and therefore this operation can be simply integrated into the previous process. In addition, complicated bath methods can be avoided. Tests by the applicants have shown that the strength of the integrally bonded connection can be increased with this surface structuring.

FIG. 7 illustrates a plasma source 100 for plasma coating. Plasma sources are known as such. The plasma source 100 is connected to an energy supply 102 which supplies electrical energy to a cathode 104 and an anode 106 in order to form a light arc 108 therebetween. The light arc chamber 110 which is of cylindrical design has a plurality of cascade plates 112 which each contain a plasma chamber 114. A plasma gas 116 is supplied via a plurality of plasma gas connections 118. Furthermore, an inert gas 120 is introduced into the light arc chamber 110. By means of a suitable outlet geometry, a substantially rectangular, uniform plasma jet 122 is produced for the plasma coating of a splice region.

FIG. 8 illustrates, at the top and bottom in different enlargements, a microstructured functional layer which is the result of the plasma coating. By means of the micro structured, fractal geometry, the splice region has a higher effective surface than an untreated splice region. Tests by the applicants have also revealed here that the strength of the connection can therefore be increased.

With the concepts described herein, the application region of laser welding methods can be extended to complex systems of fiber-reinforced plastics materials or workpieces without transparent regions being required or without heat having to be passed through an excessively high amount of the component. Overall, connections between fiber composite components can therefore be produced more simply and more robustly.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 manufacturing machine
12 tool transport device
14 machining head
16 tool transport unit
18 cylinder
20 guide device
22 guide roller
26 workpiece
28 connecting body
30 machining head guide device
32 supporting frame
34 cylinder couplings
36 pressing device
38 pressing roller
40 laser device
42 laser beam
44 scanner module
45 scanner mirror
46 filling material supply device
48 filling material
50 counter pressing device
52 counter pressing roller
54 blade
56 end region
58 blade guide roller
60 seam region
62 first workpiece
64 second workpiece
66 workpiece layer
68 splice region
70 workpiece layer
72 workpiece layer wide side
74 workpiece layer narrow side
76 lowermost workpiece layer
78 manufacturing gap
80 workpiece intermediate layers
82 uppermost workpiece layer
84 metal sheet
86 first connecting body
88 connecting tape
90 further connecting bodies
92 splice region
94 surface structure
100 plasma source
102 energy supply
104 cathode
106 anode
108 light arc
110 light arc chamber
112 cascade plate
114 plasma chamber
116 plasma gas
118 plasma gas connections
120 inert gas
122 plasma jet

The invention claimed is:

1. A joining method for connecting at least two thermoplastic workpieces, with the steps of:
   a) splicing edge regions on a first workpiece and a second workpiece in order to produce splice regions on each of the first and second workpieces region, wherein—at least one of: the splicing takes place by at least one of corresponding fiber placement, material abrasion, laser ablation, machining or milling, the at least one splice region is formed in a stepped manner by a plurality of workpiece layers of the workpiece, the splice region is pretreated by fibers of the workpiece being exposed, the splice region is pretreated by fibers of the workpiece being exposed by means of laser surface treatment, the splice region is pretreated by the first one of the workpieces being coated with a microstructured functional layer, or the splice region is pretreated by the workpiece being plasma-coated with a microstructured functional layer;
   b) positioning the first and second workpieces relative to one another in such a manner that the splice regions of the first workpiece and the second workpiece bound a seam region and are in mirror relationship forming a gap extending parallel to lengths of the first and second workpieces and between respective lowermost surfaces of the first and second workpieces;
   c) inserting a connecting body into the seam region and heating part of the connecting body by means of local input of heat in order to form an integrally bonded connection between each workpiece and the connecting body, and when the connecting body layer is inserted, the connecting body is pressed by a pressing device which detects the connecting body, and a counter pressing device which detects the first and second workpieces and the counter pressing device has a blade which is introduced into the gap between the respective lowermost surfaces of the first and second workpieces when the pressing takes place.

2. The joining method as claimed in claim 1, wherein, in step b), the workpieces are positioned in such a manner that a width of the seam region increases or increases step by step in a direction perpendicular to the workpiece layers from a lowermost surfaces to the uppermost surfaces of the first and second workpieces.

3. The joining method as claimed in claim 1, wherein, in step c), the pressing device detects the connecting body on a connecting body wide side facing away from the first and second workpieces.

4. The joining method as claimed in claim 3, wherein the pressing device comprises a pressing roller.

5. The joining method as claimed in claim 1, wherein, in step c), the connecting body is heated on an individual, connecting body wide side.

6. The joining method as claimed in claim 1, wherein, in step c), a plurality of connecting bodies are inserted and heated layer by layer in order to produce a connecting body layer which is connected in an integrally bonded manner to the first and second workpieces.

7. The joining method as claimed in claim 1, wherein the counter pressing device detects a lowermost layer of at least one of the first and second workpieces.

8. The joining method as claimed in claim 1, wherein at least one of:

the counter pressing device extends below and between the first and second workpieces;

the counter pressing device has a counter pressing roller which is arranged opposite the pressing device.

9. The joining method as claimed in claim 8, wherein the counter pressing roller is arranged on an end region of the blade.

10. The joining method as claimed in claim 1, wherein, in step c), when a second or further connecting body layer is inserted, the connecting body is pressed against the first and second workpieces, only by means of the pressing device which detects the connecting body.

11. The joining method as claimed in claim 10, wherein the connecting body is pressed against a workpiece layer corresponding to the connecting body layer.

12. The joining method as claimed in claim 1, wherein, in step c), the heating takes place by scanning a laser beam over the seam region.

13. The joining method as claimed in claim 1, wherein, in step c), the manufacturing gap is filled by means of filling material during an insertion and heating of a first connecting body layer.

14. The joining method as claimed in claim 1, wherein
the connecting body is in the form of a flexible connecting strip;
the connecting body contains an at most partially cured fiber reinforced plastic or is manufactured therefrom;
the connecting body contains a metal sheet or is manufactured therefrom;
the connecting body contains a fiber metal layer or is manufactured therefrom;
the connecting body contains a multi-layered, fiber reinforced plastic or is manufactured therefrom; or
the connecting body contains a fiber reinforced plastic and the fiber reinforced plastic is one of a carbon fiber reinforced plastic or a glass fiber reinforced plastic.

\* \* \* \* \*